United States Patent [19]

Kanemasa

[11] Patent Number: 4,707,824
[45] Date of Patent: Nov. 17, 1987

[54] METHOD AND APPARATUS FOR CANCELLING ECHO

[75] Inventor: Akira Kanemasa, Tokyo, Japan

[73] Assignee: NEC Corporation, Japan

[21] Appl. No.: 679,825

[22] Filed: Dec. 10, 1984

[30] Foreign Application Priority Data

Dec. 15, 1983 [JP] Japan ............................ 58-236734
Dec. 15, 1983 [JP] Japan ............................ 58-236736

[51] Int. Cl.$^4$ ............................................. H04B 3/23
[52] U.S. Cl. ................................. 370/32.1; 379/410
[58] Field of Search ............... 179/170.2, 170.6, 170.8; 370/32, 32.1; 379/406, 410, 407, 411

[56] References Cited

U.S. PATENT DOCUMENTS

| 3,787,645 | 1/1974 | Ochiai et al. ........................ 379/410 |
| 4,007,341 | 2/1977 | Sourgens et al. ................ 179/170.2 |
| 4,334,128 | 6/1982 | Snijders ............................ 179/170.2 |
| 4,539,674 | 9/1985 | Carlqvist et al. ..................... 370/32 |
| 4,621,172 | 11/1986 | Kanemasa et al. ................. 370/32.1 |

OTHER PUBLICATIONS

"Large-Scale Integration of Hybrid-Method Digital Subscriber Loops", IEEE Transactions on Communications, vol. COM-30, No. 9, Sep. 1982, pp. 2095–2108.

Primary Examiner—Rubinson Gene Z.
Assistant Examiner—R. Vaas
Attorney, Agent, or Firm—Laff, Whitesel, Conte & Saret

[57] ABSTRACT

A method and apparatus cancels an echo by using an echo replica generated such that a tap coefficient of an adaptive filter is sequentially updated, the echo being received from a transmitting end to a four-wire side through a two/four wire converter and being obtained such that a pulse signal having positive and negative polarities is fed into a receiving end, wherein a difference signal (error signal) between the echo replica and a reception signal is calculated; a correlation value between a signal representing a polarity of the error signal and a signal representing a polarity of the echo replica is calculated; when the correlation value is smaller than a predetermined value, a first of two types of tap coefficients which belong to each of a plurality of taps is updated based on at least the error signal and is set as the tap coefficient of the adaptive filter during a period in which the pulse signal is set in the positive polarity, and a second type of tap coefficient is updated based on at least the error signal and is set as the tap coefficient of the adaptive filter during a period in which the pulse signal is set in the negative polarity; and when the correlation value is larger than the predetermined value, the first and second types of tap coefficients are updated irrespective of the polarity of the transmission pulse on the basis of the error signal.

9 Claims, 4 Drawing Figures

METHOD AND APPARATUS FOR CANCELLING ECHO

BACKGROUND OF THE INVENTION

The present invention relates to a method and apparatus for cancelling an echo, wherein an asymmetrical component in positive and negative transmission pulses can be cancelled so as to realize two-wire bidirectional data transmission.

An echo canceller is conventionally used to achieve two-wire bidirectional data transmission using paired wires. A conventional echo canceller uses an adaptive digital filter for generating an echo replica corresponding to a transmission data sequence having the same length of impulse response as the echo and cancels the echo in accordance with the echo replica. In this case, each tap coefficient of the adaptive digital filter is updated in accordance with correlation between an error signal obtained by subtracting the echo replica from the echo and the transmission data. Assume the echo cancellation in baseband data transmission. AMI (alternate mark inversion) or a biphase coding which has a good DC balance is generally used as transmission line coding. In unipolar/bipolar conversion of AMI coding, a signal of level 0 is generated when a binary value is set at logic "0". Pulses of $+V$ and $-V$ ($V > 0$) levels are alternately generated every time the binary value is set at logic "1". In this case, ideally the $+V$ level positive pulse is symmetrical with the $-V$ level negative pulse. However, the positive and negative pulses are slightly asymmetrical in practice. In the conventional adaptive digital filter based on the assumption that the positive and negative pulses are symmetrical, an asymmetrical component causes an increase in a residual echo level, thus preventing a desired echo suppression. When the impulse response level of the echo at an n-th tap of the filter with respect to the positive pulse is $+V'$, and the level with respect to the negative pulse is $-(V'+\beta)$ (where $\beta \neq 0$), the coefficient of the n-th tap is converged to $\{V'+(V'+\beta)\}/2 = V'+\beta/2$. Therefore, the coefficient of the n-th tap is subjected to an error of $\beta/2$. This ratio can be applied to all tap coefficients. When the positive and negative transmission pulses are asymmetrical, the residual echo level is increased, and desired echo suppression cannot be obtained. For example, in baseband data transmission using paired telephone wires installed between a telephone station and a subscriber, echo suppression of about 50 dB is required. In order to obtain an echo suppression of 50 dB, the symmetry of the positive and negative pulses must be accomplished with a high precision in the order of 99.997%. Although a conventional CMOS gate is used to obtain symmetrical positive and negative voltages, as described in "Large-Scale Integration of Hybrid-Method Digital Subscriber Loops", IEEE Transactions on Communications, Vol. COM-30, No. 9, September 1982, PP. 2095-2108, this CMOS gate is clamped with diodes, so it is difficult to obtain a precise symmetry between the positive and negative pulses. Furthermore, in order to obtain highly precise symmetrical positive and negative pulses, a complicated circuit with many timing points is required. Because of this, circuit adjustment becomes time-consuming, resulting in high cost.

SUMMARY OF THE INVENTION

It is an object of the present invention to provide a method and apparatus for cancelling an asymmetrical component of positive and negative pulses, wherein a compact circuit arrangement can be obtained, and circuit adjustment is not required.

According to an aspect of the present invention, there is provided a method and apparatus for cancelling an echo by using an echo replica generated such that a tap coefficient of an adaptive filter is sequentially updated, the echo being received from a transmitting end to a four-wire side through a two/four wire converter and being obtained such that a pulse signal having positive and negative polarities is fed into a receiving end, wherein a difference signal (error signal) between the echo replica and a reception signal is calculated; a correlation value between a signal representing a polarity of the error signal and a signal representing a polarity of the echo replica is calculated; when the correlation value is smaller than a predetermined value, a first of two types of tap coefficients which belong to each of a plurality of taps is updated based on at least the error signal and is set as the tap coefficient of the adaptive filter during a period in which the pulse signal has the positive polarity, a second type of tap coefficient is updated based on at least the error signal and is set as the tap coefficient of the adaptive filter during a period in which the pulse signal is set in the negative polarity; and when the correlation value is larger than the predetermined value, the first and second types of tap coefficients are updated irrespective of the polarity of the transmission pulse on the basis of the error signal.

According to another aspect of the present invention, there is provided a method and apparatus for cancelling an echo by using an echo replica generated such that a tap coefficient of an adaptive filter is sequentially updated, the echo being received from a transmitting end to a four-wire side through a two/four wire converter and being obtained such that a pulse signal having positive and negative polarities is fed into a receiving end, wherein a difference signal (error signal) between the echo replica and a reception signal is calculated; a correlation value between a signal representing a polarity of the error signal and a signal representing a polarity of the echo replica is calculated; when the correlation value is smaller than a predetermined value, a first of two types of tap coefficients which belong to each of a plurality of taps is updated based on at least the error signal and is set as the tap coefficient of the adaptive filter during a period in which the pulse signal has the positive polarity, a correction coefficient is updated based on at least the error signal, and an updated correction coefficient is added to the first type of tap coefficient to generate a second type of tap coefficient as the tap coefficient of the adaptive filter during a period in which the pulse signal has the negative polarity; and when the correlation value is larger than the predetermined value, the first type of tap coefficient is updated irrespective of the polarity of the transmission pulse on the basis of the error signal and updating of the correction coefficient is discontinued.

DETAILED DESCRIPTION OF THE PREFERRED EMBODIMENTS

In order to best understand the present invention, a first principle of echo cancellation according to the present invention will be described hereinafter.

Two types of tap coefficients which belong to each of a plurality of taps of an adaptive digital filter are prepared in accordance with the transmission pulses of first (positive) and second (negative) polarities and are updated independently of each other so as to prevent degradation of echo suppression caused by asymmetrical pulses of first and second polarities. An asymmetrical component of the transmission pulses of the first and second polarities is generally small, so it is inconvenient to provide two coefficients respectively corresponding to the pulses of the first and second polarities, thus prolonging the convergence time unnecessarily. For these reasons, the fact is paid attention wherein correlation between the polarity of the error signal and the polarity of the echo replica represents a degree of convergence of the echo canceller. When a correlation output exceeds a predetermined value, the first and second types of tap coefficients are updated irrespective of the polarities of the transmission data. However, when the correlation output is smaller than the predetermined value, the coefficients are updated in accordance with the polarities of the transmission data. In this manner, the asymmetrical component of the pulses of the first and second polarities which appears when the convergence progresses can be cancelled.

According to a second principle of the present invention, the second type of tap coefficient is obtained by adding the first type of tap coefficient and an updated correction coefficient. When the correlation output is smaller than the predetermined value, the tape coefficients are updated in accordance with the polarities of the pulses. However, unlike the first principle, when the correlation output is larger than the predetermined value, the first tap coefficient is updated irrespective of the polarity of the pulse while updating of the correction coefficient is inhibited.

An echo canceller based on the first principle will be described in detail with reference to the accompanying drawings according to an embodiment of the present invention.

Figure 1:
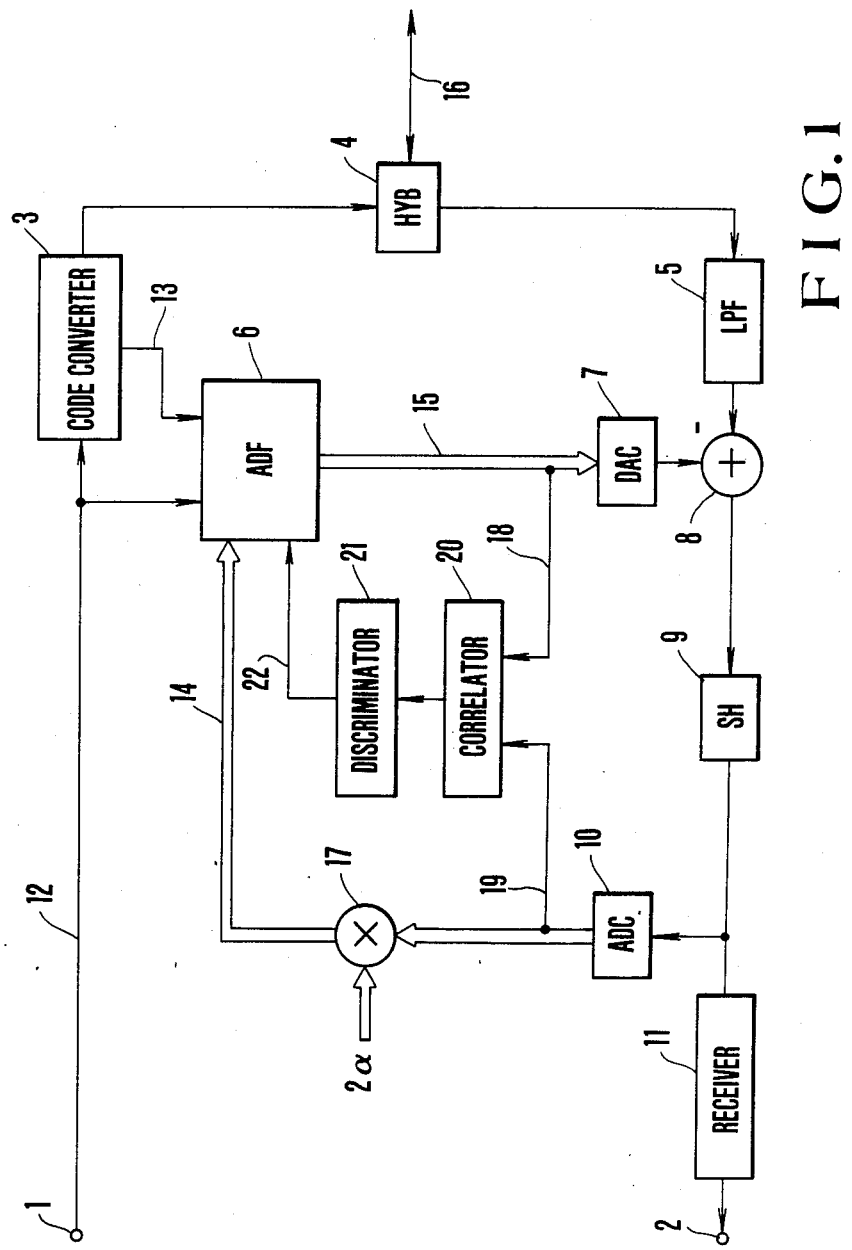
FIG. 1 is a block diagram of an echo canceller according to an embodiment of the present invention.

FIG. 1 is a block diagram of an echo canceller. The circuit shown in FIG. 1 is connected to an identical circuit through a two-wire transmission line 16. When this transmission line comprises a subscriber cable, one circuit is installed in the station side, and the other circuit is installed in the subscriber side. The circuit shown in FIG. 1 comprises a subscriber circuit in baseband data transmission. A transmission line code comprises an AMI code. However, the present invention can be applied to any other transmission line code as will be described later.

Referring to FIG. 1, a binary code signal 12 is supplied to a code converter 3 and an adaptive digital filter (ADF) 6. The code converter 3 converts a binary code to an AMI code. A binary code "0" is an instruction for generating a signal "0". A binary code "1" is an instruction for alternately generating positive and negative pulses. In this case, a sign bit 13 representing that a positive or negative pulse is generated in response to the binary code "1" is supplied to the adaptive digital filter 6. It should be noted that a sign bit "0" corresponds to a positive pulse, and that the sign bit "1" corresponds to the negative pulse. A pulse width of the positive or negative pulse is generally set to T/2, where T is a data rate of a binary code signal 12 and is expressed in units of seconds. An output from the code converter 3 is sent onto the two-wire transmission line 16 through a hybrid transformer (HYB) 4.

A signal transmitted from the station is supplied to a low-pass filter (LPF) 5 through the hybrid transformer 4. In the hybrid transformer 4, an output signal from the code converter 3 is generated as an echo due to mismatching of impedance. The echo appears in the output from the hybrid transformer 4. An input signal to the low-pass filter 5 is a composite signal consisting of a reception signal and the echo. The low-pass filter 5 eliminates high-frequency noise outside the predetermined band. A closed loop circuit comprising the adaptive digital filter 6, a D/A converter (DAC) 7, a subtracter 8, a sample-and-hold circuit (SH) 9, an A/D converter (ADC) 10 and a multiplier 17 for multiplying an input with constant $2\alpha$ adaptively generates an echo replica 15. The echo replica is used to suppress the echo component included in the composite signal as an output from the low-pass filter 5. The adaptive digital filter 6 is adaptively operated to decrease a level of an error signal 14 obtained by weighting the output generated from the A/D converter 10 with the constant $2\alpha$.

A sign bit 18 of the echo replica 15 which is an output from the adaptive digital filter 6 and a sign bit 19 which is an output from the A/D converter 10 are supplied to a correlator 20, and a correlation between these signals is calculated. An output from the correlator 20 is supplied to a discriminator 21, which then generates a discrimination output 22. The discrimination output 22 is supplied to the adaptive digital filter 6.

The discriminator 21 generates an output of logic "1" when the absolute value of the input signal is smaller than a predetermined value. However, the discriminator 22 generates an output of logic "0" when the absolute value of the input signal is larger than the predetermined value. In this manner, the discrimination signal 22 comprises a binary signal.

The role of the discrimination output 22 in the adaptive digital filter 6 will be described later. The embodiment shown in FIG. 1 employs the AMI code whose bandwidth is substantially 1/T Hz. A sampling frequency of the adaptive digital filter 6 is given as 2/T Hz. The sampling frequency of each of the D/A converter 7, the sample-and-hold circuit 9 and the A/D converter 10 is also set to 2/T Hz. When the adaptive digital filter 6 is held in the converged state, the echo signal in the output from the sample-and-hold circuit 9 is sufficiently attenuated as compared with the attenuated state of the reception signal. This attenuated echo signal is supplied to the receiver 11. Transmission line loss is compensated for in the receiver 11, and a compensated signal is supplied to the discriminator. The AMI code is converted to a binary code which appears at an output terminal 2.

Figure 2:
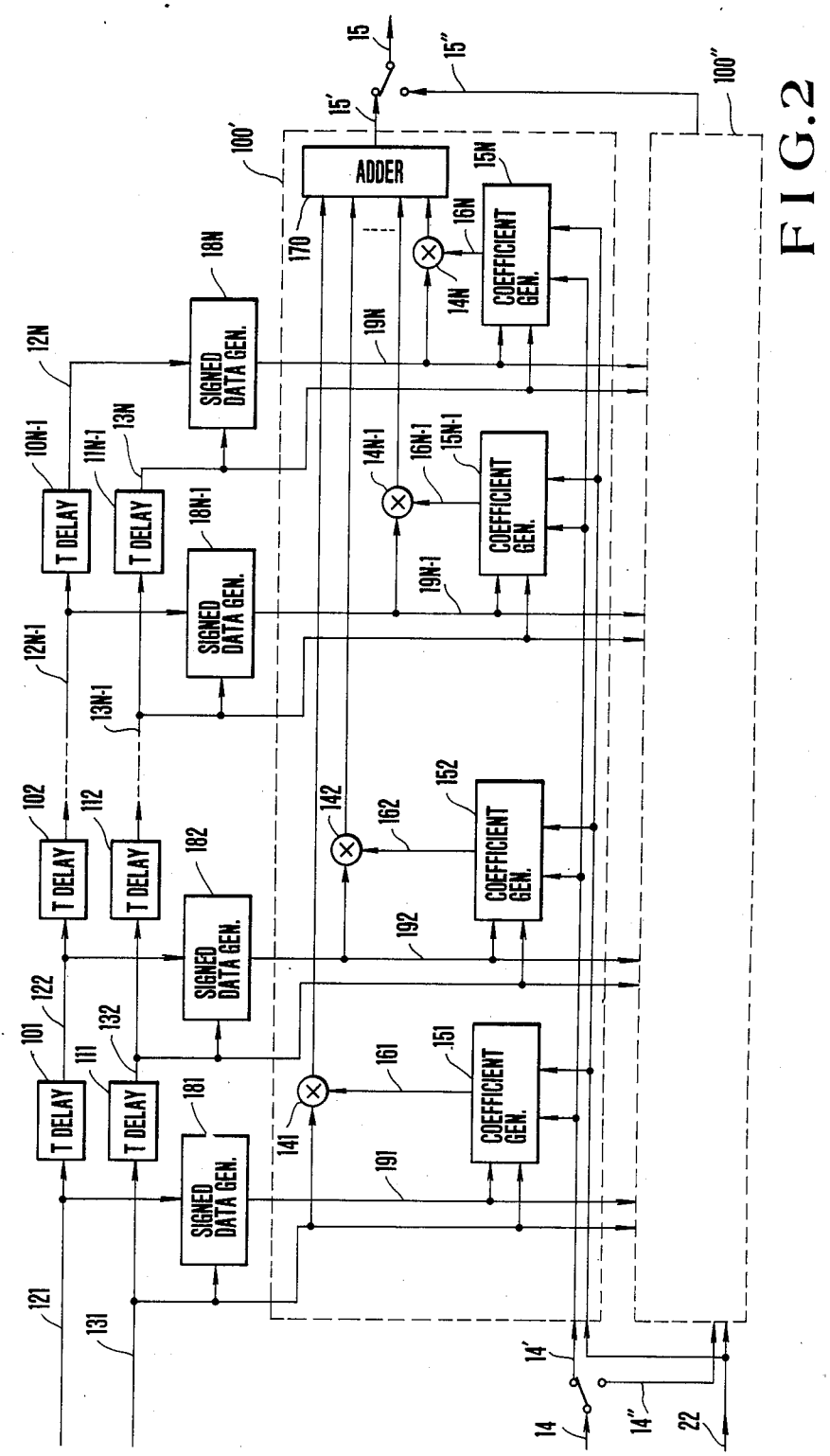
FIG. 2 is a block diagram showing the detailed arrangement of an adaptive digital filter shown in FIG. 1.

The adaptive digital filter 6 will be described in detail hereinafter. FIG. 2 is a block diagram of the adaptive digital filter 6. Referring to FIG. 2, a portion surrounded by a dotted rectangle represented by reference numeral 100' has the same function as that denoted by reference numeral 100". Reference numerals 14, 15 and 22 correspond to the signals represented by the same reference numerals as in FIG. 1 and denote an error signal, an echo replica and a discrimination output, respectively. A sampling frequency of each of the error signal 14 and the echo replica 15 is 2/T Hz. The error signal 14 is thus divided by a switch shown in FIG. 2 into two error signals 14' and 14" each having a sampling frequency of 1/T Hz. Two echo replicas 15' and 15" each having the sampling frequency of 1/T Hz are interleaved by a switch to obtain the echo replica 15 having a sampling frequency of 2/T Hz. The filter shown in FIG. 2 comprises a transversal filter having N taps (where N is a positive integer and is determined by an impulse response duration of the echo). Since the parts 100' and 100" have the same function, only the operation of the part 100' will be described.

The respective tap coefficients of the adaptive digital filter 6 are generated by coefficient generators 151, 152, ..., 15N-1 and 15N. A binary code signal 121 and a sign bit 131 in FIG. 2 correspond to the signals represented by reference numerals 12 and 13 in FIG. 1, respectively. The binary code signal 121 and the sign bit 131 are supplied to delay elements 101 and 111 for delaying the input signals by T seconds, respectively. T-second delay elements 101, 102, ..., and 10N-1 are connected in series with each other in the order named. N binary code signals 12$i$ ($i$=1, 2, ..., N) as inputs and tap outputs are supplied to signed data (data with sign) generators 18$i$, respectively. T-second delay elements 111, 112, ..., and 11N-1 are connected in series with each other in the order named. N sign bits 13$i$ ($i$=1, 2, ..., and N) as inputs and tap outputs are supplied to the signed data generators 18$i$ and coefficient generators 15$i$, respectively. The signed data generators 18$i$ receive the binary code signals 12$i$ and the sign bits 13$i$ and generate data with sign or signed data 19$i$, respectively. As previously mentioned, since the logic values "0" and "1" of the sign bit 13$i$ represent positive and negative values, the signed data 19$i$ is given in Table 1 as follows:

TABLE 1

| Truth Table of Signed Data Generator | | |
| --- | --- | --- |
| Sign bit 13i | Binary code signal 12i | Signed data 19i |
| 0 | 0 | 0 |
| 0 | 1 | +1 |
| 1 | 0 | 0 |
| 1 | 1 | −1 |

Outputs from multipliers 141, 142, ..., 14N-1 and 14N are added by an adder 170 which then produces the echo replica 15'. This echo replica 15' is supplied to the switch. The error signal 14' is commonly supplied to the coefficient generators 151, 152, ..., 15N-1 and 15N. The discrimination output 22 corresponds to the signal represented by the same reference numeral in FIG. 1. The discrimination output 22 is commonly supplied to the coefficient generators 151, 152, ..., 15N-1 and 15N. Each coefficient generator 15$i$ ($i$=1, 2, ..., and N) sequentially updates the corresponding coefficient in accordance with four signals, i.e., the signed data 19$i$, the sign bit 13$i$, the error signal 14' and the discrimination output 22. The respective coefficients from the coefficient generators 15$i$ are multiplied by the multipliers 14$i$ with the corresponding signed data 19$i$, respectively. The multiplied signals are then supplied to the adder 170. The operation of the block represented by the reference numeral 100" is the same as that by the reference numeral 100', but a phase shift of T/2 seconds is present between the blocks 100' and 100".

Figure 3:
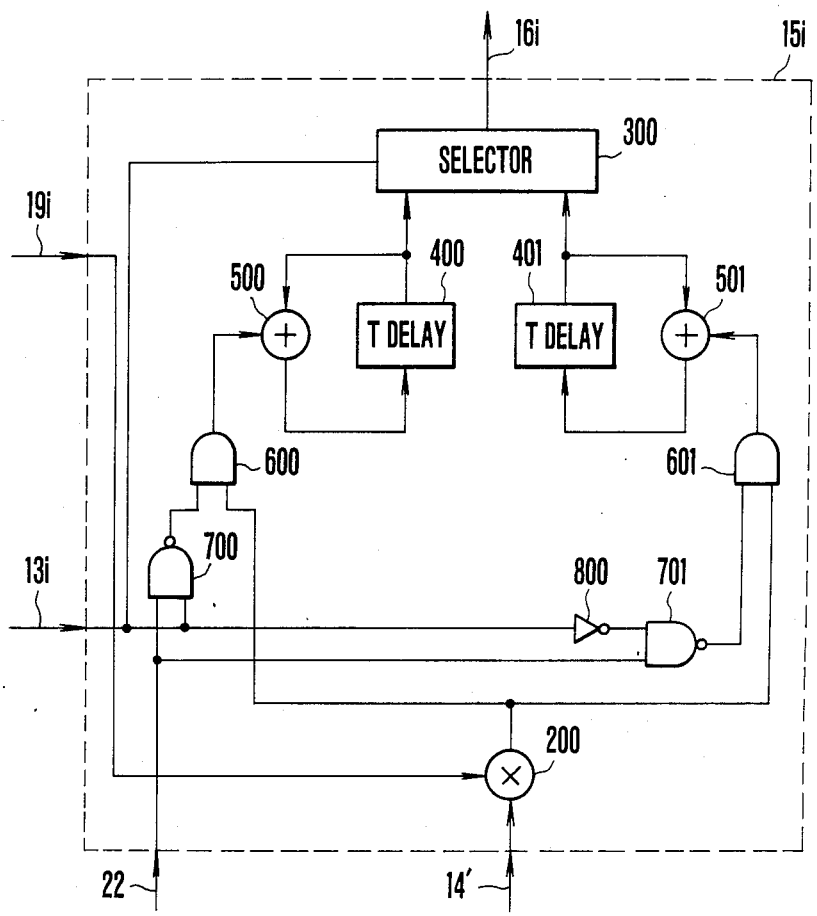
FIG. 3 is a block diagram showing the detailed arrangement of a coefficient generator shown in FIG. 2.

The coefficient generator 15$i$ will be described in detail hereinafter. FIG. 3 is a block diagram showing the detailed arrangement of each of the coefficient generators 15$i$. The portion surrounded by the dotted line corresponds to each coefficient generator 15$i$. An error signal 14', signed data 19$i$, a sign bit 13$i$, a discrimination output 22 and a coefficient 16$i$ correspond to the signals represented by the same reference numerals in FIG. 2. Referring to FIG. 3, the error signal 14' and the signed data 19$i$ are multiplied by a multiplier 200. A product signal from the multiplier 200 is supplied to one input terminal of an AND gate 600 and one input terminal of an AND gate 601.

The sign bit 13$i$ comprises a signal which represents a polarity of the signed data 19$i$ which is supplied together therewith. When the sign bit 13$i$ is set at logic "0", the signed data 19$i$ has the positive polarity. However, when the sign bit 13$i$ is set at logic "1", the signed data 19$i$ has the negative polarity. The sign bit 13$i$ is supplied as a selection signal to a selector 300 and to one input terminal of a NAND gate 700 and an inverter 800. An output from the inverter 800 is supplied to one input terminal of a NAND gate 701. The discrimination output 22 is supplied to the other input terminal of the NAND gate 701 and the other input terminal of the NAND gate 700. Outputs from the NAND gates 700 and 701 are supplied to the other input terminal of the AND gate 600 and the other input terminal of the AND gate 601. A closed loop circuit comprising a T-second delay element 400 and an adder 500 generates a coefficient corresponding to the positive pulse. The coefficient is updated in response to the output from the AND gate 600 which is supplied to the adder 500.

A closed loop circuit consisting of the T-second delay element 401 and an adder 501 generates a coefficient corresponding to the negative pulse. The coefficient is sequentially updated in response to the output from the AND gate 601 which is supplied to the adder 501.

The role of the discrimination output 22 shown in FIG. 3 will be described in detail with reference to FIG. 1 hereinafter. Referring to FIG. 1, the absolute value of the output from the correlator 20 during convergence of the adaptive digital filter is larger than that after convergence. This is because the sign bits 18 and 19 have a strong correlation during convergence that becomes weak after convergence. When the absolute value of the output from the correlator 20 is smaller than a predetermined value, the discriminator 21 generates an output of logic "1". However, when the absolute value of the output from the correlator 20 is larger than the predetermined value, the discriminator 21 generates an output of logic "0". When the discrimination output 22 is set at logic "0", it indicates that the echo canceller is operated for convergence. However, when the discrimination output 22 is set at logic "1", it indicates that the echo canceller is already converged.

Referring to FIG. 3, when the discrimination output 22 is set at logic "0", i.e., when the echo canceller is operated for convergence, outputs from the NAND gates 700 and 701 are set at logic "1", so that an output value from the multiplier 200 is supplied to the adders 500 and 501 through the NAND gates 600 and 601. When the initial values of the delay elements 400 and 401 are the same, outputs therefrom are the same until the discrimination output 22 is set at logic "1". In this case, input signals (i.e., the output signals from the delay elements 400 and 401) to the selector 300 are the same, so that the value of the coefficient 16$i$ is not associated with the value "0" or "1" of the sign bit supplied as the selection signal. Therefore, when the echo canceller is operated for convergence, convergence is performed irrespective of the positive and negative pulses. However, when the convergence of the echo canceller progresses, the discrimination output 22 changes from logic "0" to logic "1". In this case, in the logic circuit consisting of the AND gate 600 and the NAND gate 700, an output from the AND gate 600 is generated only when the sign bit 13$i$ is set at logic "0" (i.e., only for the positive pulse). In the closed loop consisting of the delay element 400 and the adder 500, only the positive pulse is updated. However, when the discrimination output 22 is set at logic "1", in the logic circuit consisting of the AND gate 601 and the NAND gate 701, an output from the AND gate 601 is generated only when the sign bit 13$i$ is set at logic "1" (i.e., only for the negative pulse). In the closed loop circuit consisting of the delay element 401 and the adder 501, only the negative pulse is updated.

The selector 300 selects an output from the delay element 400 in response to the sign bit 13$i$ supplied as the selection signal when the sign bit 13$i$ is set at logic "0". In this case, the selector 300 generates the output from the delay element 400 as the coefficient 16$i$. However, when the sign bit 13$i$ is set at logic "1", the output from the delay element 401 is selected by the selector 300. In this case, the selector 300 generates the output from the delay element 401 as the coefficient 16$i$.

As is apparent from the above description, the two types of coefficients corresponding to the polarities of the transmission pulses are switched in the coefficient generator 15$i$ in accordance with the degree of convergence of the echo canceller. As a result, the convergence time will not be prolonged unnecessarily, and nonlinearity between the positive and negative pulses can be prevented.

As is apparent from the above description according to this embodiment, the two types of tap coefficients corresponding to the polarities of the transmission pulses are prepared, and a method of converging these coefficients changes in accordance with a degree of convergence of the echo canceller, so that the convergence time will not be prolonged unnecessarily, and the echo signal caused by an asymmetrical component between the positive and negative pulses can be prevented. As a result, a complicated circuit is not required for the generation of the positive and negative pulses, and a compact echo canceller requiring no circuit adjustment can be obtained in accordance with the method described.

Figure 4:
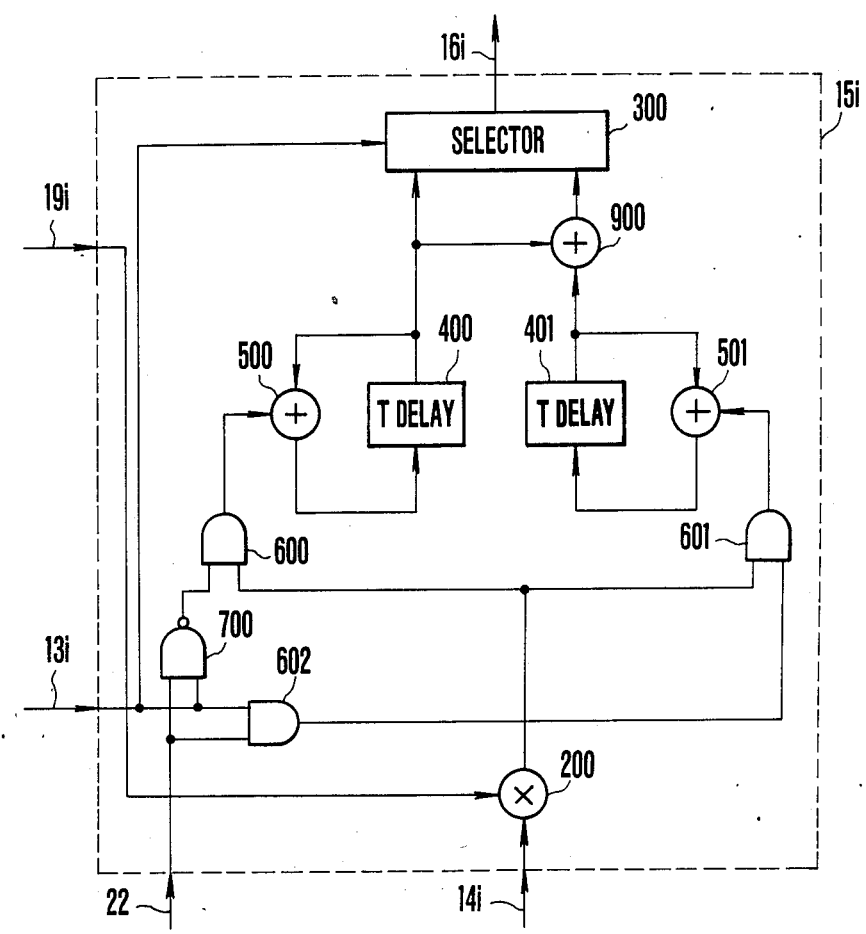
FIG. 4 is a block diagram showing the detailed arrangement of a coefficient generator in an echo canceller according to another embodiment of the present invention.

A method and apparatus for cancelling an echo signal on the basis of the second principle of the present invention will be described according to another embodiment. FIG. 4 is a block diagram showing the detailed arrangement of each coefficient generator in an adaptive digital filter. The same reference numerals as in FIG. 4 denote the same parts as in FIGS. 1 to 3, and a detailed description thereof will be omitted.

Referring to FIG. 4, the portion surrounded by the dotted line corresponds to each coefficient generator 15$i$. An error signal 14', signed data 19$i$, a sign bit 13$i$, a discrimination output 22 and a coefficient 16$i$ correspond to the signals represented by the same reference numerals in FIG. 2. Referring to FIG. 4, the error signal 14' and the signed data 19$i$ are multiplied by a multiplier 200. A product signal from the multiplier 200 is supplied to one input terminal of an AND gate 600 and one input terminal of an AND gate 601.

The sign bit 13$i$ is a signal which represents a polarity of the signed data 19$i$ which is supplied together therewith. When the sign bit 13$i$ is set at logic "0", the signed data 19$i$ has the positive polarity. However, when the sign bit 13$i$ is set at logic "1", the signed data 19$i$ has the negative polarity. The sign bit 13$i$ is supplied as a selection signal to a selector 300 and to one input terminal of a NAND gate 700 and one input terminal of an AND gate 602. An output from the AND gate 602 is supplied to the one input terminal of the AND gate 601. A discrimination output 22 is supplied to the other input terminal of the NAND gate 700 and the other input terminal of the AND gate 602. An output from the NAND gate 700 is supplied to the other input terminal of the AND gate 600. A closed loop circuit consisting of a T-second delay element 400 and an adder 500 generates a coefficient corresponding to a positive pulse in the same manner as in the first embodiment. This coefficient is updated in response to the output from the AND gate 600 which is supplied to the adder 500. A closed loop circuit consisting of a T-second delay element 401 and an adder 501 generates a correction coefficient corresponding to a negative pulse. The correction value is updated in response to the output from the AND gate 601 which is supplied to the adder 501. An output from the delay element 400 is supplied to an adder 900. The adder 900 also receives an output from the delay element 401 and adds the outputs from the delay elements 400 and 401. The sum represents the coefficient corresponding to a negative pulse. The outputs from the delay element 400 and the adder 900 are supplied to the selector 300 which then selects one of the outputs as the coefficient 16$i$.

The role of the discrimination output 22 shown in FIG. 4 will be described with reference to FIG. 1 since the second embodiment has the same circuit arrangement (FIG. 1) as in the first embodiment. Referring to FIG. 1, absolute value of the output from the correlator 20 during convergence of the adaptive digital filter is larger than that after convergence in the same manner as in the first embodiment. This is because the sign bits 18 and 19 have a strong correlation during convergence but the correlation becomes weak after convergence. When the absolute value of the output from the correlator 20 is smaller than a predetermined value, the discriminator 21 generates an output of logic "1". However, when the absolute value of the output from the correlator 20 is larger than the predetermined value, the discriminator 21 generates an output of logic "0". When the discrimination output 22 is set at logic "0", it indicates that the echo canceller is operated for convergence. However, when the discrimination output 22 is set at logic "1", it indicates that the echo canceller is already converged.

Referring to FIG. 4, when the discrimination output 22 is set at logic "0", i.e., when the echo canceller is operated for convergence, an output from the NAND gate 700 is set at logic "1", so that an output from the multiplier 200 is supplied to the adder 500 through the AND gate 600. In the closed loop circuit consisting of the delay element 400 and the adder 500, the transmission pulse is updated irrespective of the value of the sign bit 13$i$.

When the output from the AND gate 601 is set at logic "0", a signal of logic "0" is supplied from the AND gate 601 to the adder 501. In the closed loop circuit consisting of the delay element 401 and the adder 501, the coefficient is not updated. When the initial value of the delay element 401 is set to zero, the output from the adder 900 which is then supplied to the selector 300 is the same as the output from the delay element 400. Therefore, the value of the coefficient 16$i$ is not associated with the value "0" or "1" of the sign bit 13$i$ supplied as the selection signal. In this manner, when the echo canceller is operated for convergence, the convergence is performed irrespective of the positive and negative pulses.

However, when the convergence of the echo canceller progresses, the discrimination output 22 changes from logic "0" to logic "1". In the logic circuit consisting of the AND gate 600 and the NAND gate 700, the output from the AND gate 600 is generated only when the sign bit 13$i$ is set at logic "0" (i.e., for only a positive pulse). Therefore, in the closed loop circuit consisting of the delay element 400 and the adder 500, the coefficient for the positive pulse is updated.

When the discrimination output 22 is set at logic "1", in the logic circuit consisting of the AND gates 601 and 602, an output from the AND gate 601 is generated when the sign bit 13$i$ is set at logic "1" (i.e., for only a negative pulse). In the closed loop circuit consisting of the delay element 401 and the adder 501, only the coefficient for a negative pulse is updated. The selector 300 selects the output from the delay element 400 in response to the sign bit 13$i$ of logic "0" supplied as the selection signal and generates the output from the delay element 400 as the coefficient 16$i$. However, when the sign bit 13$i$ is set at logic "1", the output from the adder 900 is selected and appears as the coefficient 16$i$. The closed loop circuit consisting of the delay element 401 and the adder 501 compensates for the asymmetrical component between the positive and negative pulses.

As has been described in detail, in the coefficient generator 15$i$, the first coefficient corresponding to one polarity of the pulse and the correction coefficient corresponding to the other polarity are provided, and coefficient updating is performed in accordance with a degree of convergence of the echo canceller. As a result, degradation of echo suppression caused by the asymmetrical component between the positive and negative pulses can be prevented. Therefore, a complicated circuit for generating the symmetrical positive and negative pulses is not required, and a compact echo canceller with no circuit adjustment can be realized.

The present invention is not limited to the particular embodiments described above. In the above embodiments, the AMI code is exemplified as the transmission line code. However, the present invention can be effectively applied to a binary code such as a biphase code. In this case, the above embodiment can be modified as follows. Referring to FIG. 1, of the signals applied to the adaptive digital filter, the binary code signal 12 is omitted. Along with this, since the signal 121 in FIG. 2 is also omitted, the delay elements 101, 102, . . . , and 10N-1 are also omitted. Therefore, the coded data generators 171, 172, . . . , and 17N are also omitted. At the same time, the signed data 19$i$ comprises the sign bit 13$i$. Furthermore, referring to FIGS. 3 or 4, the signed data 19$i$ comprises the same signal as the sign bit 13$i$. Finally, the sampling rate of the adaptive digital filter 6 changes in accordance with the signal bandwidth of the transmission line, and a necessary number of circuits each represented by the dotted line in FIG. 2 is prepared. In this manner, the present invention can be applied to the binary code such as a biphase code.

A line loss compensation function as part of the function of the receiver 11 may be inserted between the low-pass filter 5 and the adder 8 shown in FIG. 1. The A/D converter 10 may comprise a single bit converter. The sample-and-hold circuit 9 may be connected to the receiver 11. A low-pass filter may be inserted between the D/A converter 7 and the subtracter 8, instead of omitting the sample-and-hold circuit 9. The adaptive digital filter 6 may be replaced with an adaptive analog filter. In this case, the D/A converter 7, the sample-and-hold circuit 9 and the A/D converter 10 are omitted.

Other various changes and modifications may be made within the spirit and scope of the invention.

What is claimed is:

1. A method for cancelling an echo by using an echo replica generated such that two sets of tap coefficients in an adaptive filter are sequentially updated, said method comprising the steps of:

calculating an error signal representing a difference between the echo replica and a reception signal;

calculating a correlation value between a signal representing a polarity of the error signal and a signal representing a polarity of the echo replica;

responsive to the correlation value being smaller than a predetermined value, selecting one set out of said two sets of tap coefficients according to a polarity of a transmission pulse, summing up the selected set of tap coefficients to produce the echo replica, and updating the selected set of tap coefficients by using a correlation between the error signal and the polarity of the transmission pulse; and responsive to the correlation value being larger than the predetermined value, updating both of said two sets of tap coefficients irrespective of the polarity of the transmission pulse on the basis of the error signal.

2. A method according to claim 1, wherein the two sets of tap coefficients are used for a main coefficient and a correction coefficient, respectively; and responsive to the correlation value being smaller than a predetermined value, selecting the main coefficient or the sum of the main and the correction coefficients for each tap according to a polarity of a transmission pulse to produce the echo replica, and updating the main or correction coefficient for each tap according to the selection by using the correlation between the error signal and the polarity of the transmission pulse;

and responsive to the correlation value being larger than the predetermined value, selecting the main coefficient for each tap irrespective of the polarity of the transmission pulse to produce the echo replica and updating only the main coefficient.

3. An apparatus for cancelling an echo by using an echo replica generated such that two sets of tap coefficient in an adaptive filter are sequentially updated, said apparatus comprising:

an adaptive filter for receiving a transmission data sequence with polarities and generating the echo replica;

error signal generating means for generating an error signal representing a difference between the echo replica and a reception signal;

correlating means for generating a correlation value between a signal representing a polarity of the error signal and a signal representing a polarity of the echo replica;

comparing means for comparing the correlation value and a predetermined value;

first updating means for updating a first set of tap coefficients;

second updating means for updating a second set of top coefficients;

selecting means for selecting one of the first and second sets of tap coefficients in accordance with the polarity of a transmission pulse; and controlling means for generating first and second control signals.

4. An apparatus according to claim 3, wherein said first and second updating means update the first set and the second set of tap coefficients corresponding to the positive and negative polarity of the transmission pulse, respectively, by using a correlation between the error signal and the polarity of the transmission pulse; and said controlling means generates the first control signal to activate said first updating means during a period in which the transmission pulse has the positive polarity and said second updating means during a period in which the transmission pulse has the negative polarity when the correlation value is smaller than the predetermined value, and generates the second control signal to activate said first and second updating means irrespective of the polarity of the pulse signal when the correlation value is larger than the predetermined value.

5. An apparatus according to claim 4, wherein said first updating means comprises an adder and a delay element which updates the first set of tap coefficients.

6. An apparatus according to claim 4, wherein said second updating means comprises an adder and a delay element which updates the second set of tap coefficients.

7. An apparatus acccording to claim 3, wherein said second updating means generates correction coefficients for each tap coefficient by using the error signal and each correction coefficient is added to the first set of tap coefficients; and said controlling means generates the first control signal to activate said first updating means during a period in which the transmission pulse has the positive polarity and said second updating means during a period in which the transmission pulse has the negative polarity when the correlation value is smaller than the predetermined value, and generates the second control signal to activate said first updating means irrespective of the polarity of the pulse signal and discontinue updating of the correction coefficients in said second updating means when the correlation value is larger than the predetermined value.

8. An apparatus according to claim 7, wherein said first updating means comprises an adder and a delay element which updates the first set of tap coefficients.

9. An apparatus according to claim 7, wherein said second updating means comprises a first adder, a delay circuit and a second adder, said first adder and said delay circuit being arranged so as to update the correction coefficient, and said second adder being arranged so as to add the correction coefficient and the first set of tap coefficients.

* * * * *